United States Patent
Jensen et al.

[15] 3,661,020
[45] May 9, 1972

[54] CIRCULAR ROLLER-BAND DEVICES

[72] Inventors: Preben W. Jensen, 21 Southside Avenue, Somerville, N.J. 08876; Ole R. Jensen, 126 Nottingham Street, Montvale, N.J. 07645

[22] Filed: June 30, 1970

[21] Appl. No.: 51,231

[52] U.S. Cl. ...........................................................74/192
[51] Int. Cl. ......................................................F16h 15/16
[58] Field of Search ..........................74/192, 193, 203, 82

[56] References Cited

UNITED STATES PATENTS 3,257,857   6/1966   Davin et al.................................74/192

*Primary Examiner*—Leonard H. Gerin
*Attorney*—Sughrue, Rothwell, Mion, Zinn & Macpeak

[57] ABSTRACT

The circular roller-band devices which substantially eliminate or minimize sliding friction are comprised of rotatable members arranged for movement along a circular path between two spaced walls. A flexible band is disposed about each pair of rollers in a substantially S-shaped configuration and the rollers are spaced apart a distance sufficient to prevent the rollers from overriding each other. The flexible bands may be endless and disposed about two pairs of rollers or may have the opposite ends thereof secured to each wall respectively. The rollers are conical.

6 Claims, 7 Drawing Figures

PATENTED MAY 9 1972 3,661,020

INVENTORS
PREBEN W. JENSEN
OLE R. JENSEN

BY Sughrue, Rothwell, Mion, Zinn & Macpeak

ATTORNEYS

CIRCULAR ROLLER-BAND DEVICES

BACKGROUND OF THE INVENTION

1. Field of the Invention

The present invention is directed generally to mechanical motion devices and more specifically to roller-band devices wherein a cluster of rollers are arranged for substantially frictionless rolling movement along a circular path.

2. Prior Art

In prior electro-mechanical and mechanical devices which transferred one form of motion or energy into another such as in bearings, gear systems, condition sensitive switches and the like, the accuracy, efficiency and sensitivity as well as the life of the devices have been limited by the degree or amount of sliding friction inherent in the device or sliding friction resulting from structural inaccuracies in the elements used in the device. In attempting to compensate or minimize sliding friction losses, compromises in construction are sometimes made which contribute further limiting factors in efficiency and sensitivity of the device under some operating conditions.

Attempts to minimize friction often resort to lubrication of the moving parts with various liquids, gaseous or solid lubricants. These lubricants may create forces which are detrimental to the operation of certain devices under highly sensitive operating conditions. The lubricant may contaminate critical areas within the housing or a portion thereof or require packing or sealing materials to prevent contamination and thus create other friction losses. Furthermore, under extreme operating conditions such as high and low temperatures and prolonged storage, lubricants may not perform in the desired manner and may effect either partial or complete device failure.

The efficiency of land bearing surfaces has always been limited by the ability to fabricate precision surfaces or diminesions. For instance, in bearings such as roller-bearings, misalignment of rollers results in end frictional losses and attempts to provide closer alignment with caging frequently results in additional friction losses therebetween. If the losses adjacent roller ends can be minimized, surface roughness on the rollers may cause additional losses which may substantially exceed any attainable rolling coefficient of friction thus placing a lower limit on overall efficiency.

Prior art roller band devices are known which are comprised of a housing including spaced apart walls, a plurality of rotatable members immediate said walls and movable longitudinally thereof having a combined cross-sectional dimension greater than the spacing between said walls and a flexible band looped in a generally S-shaped fashion about adjacent rotatable members. The band is provided with a portion secured to the housing and disposed adjacent one of the walls and having another portion secured to the housing and disposed adjacent the other of said walls for rolling movement of the rotatable members and the band longitudinally along the housing with adjacent rotatable members turning in opposite directions.

Although these prior art devices contemplated varying the spacing of the walls along the path of travel of the rollers and also contemplated varying the external configuration of the rolling devices, all of these prior art devices were substantially limited to straight line movement inasmuch as the surfaces of the walls were always maintained parallel to each other and the axes of rotation of the rotatable members were always disposed parallel to each other and to the opposed walls.

SUMMARY OF THE INVENTION

In view of the limitations of the prior art such as noted above, it is the object of the present invention to provide a mechanism having substantially only pure rolling friction losses and which is capable of providing movement of the roller cluster along a circular path.

The invention comprises a roller band device having a guideway having opposed conical walls, at least a pair of conical rollers intermediate the guideway walls with a combined cross-sectional dimension greater than the spacing between the opposed conical walls and a flexible band supported within the guideway and reversibly looped about the rollers so as to effect rolling movement of the rollers and band longitudinally along the guideway. The opposite ends of the band may be secured to opposite conical walls thereby providing circular movement of said rollers about the axes of said conical surfaces along a predetermined arc.

The present invention also comprises a plurality of pairs of conical rollers disposed intermediate the guideway walls with an endless flexible band reversibly looped about each pair of rollers to provide for the continuous circular motion of the roller clusters relative to the conical walls.

The present invention provides a low friction mechanical motion device which is extremely suitable for converting one form of rotary motion to another form of rotary motion or oscillating motion and vice versa. The exemplative devices described hereinafter may readily be incorporated into any mechanical device wherein such motion conversion is desired.

DETAILED DESCRIPTION OF THE INVENTION

Figure 1:
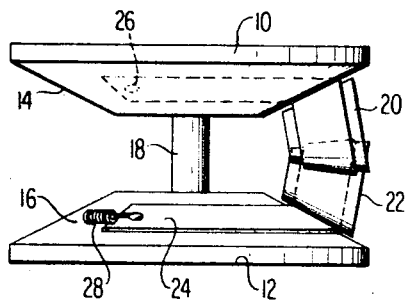
FIG. 1 is a side elevation view of a roller band device with conical guideway walls and conical roller members.
Figure 2:
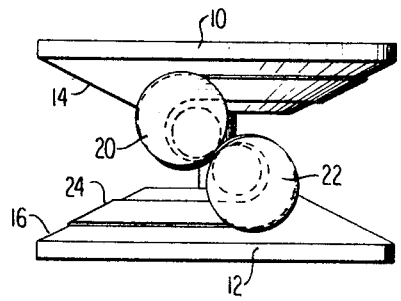
FIG. 2 is a side elevation view of the device shown in FIG. 1 but viewing the rollers in the direction of their axes.

The circular roller band device as shown in FIG. 1 is comprised of a pair of stationary support members 10 and 12 having opposed conical surfaces 14 and 16 respectively. The support members 10 and 12 are connected together by a cylindrical shaft 18 the axis of which is aligned with the axes of the conical surfaces 14 and 16. The projected conical surfaces will meet at a common apex on the axis of the cylindrical shaft 18 midway between the two support members 10 and 12. A pair of conical rollers 20 and 22 are disposed adjacent each other between the opposed conical surfaces 14 and 16 with the conical surfaces of the rollers 20 and 22 being disposed parallel to the conical surfaces 14 and 16 respectively at the point of tangency. A flexible band 24 extends in a generally S-shaped configuration partially around the roller members 20 and 22 and may be held under tension by suitable fastening means at each end. The opposite ends of the band 24 are connected to opposite surfaces 14 and 16 respectively and according to the present invention, one end of the band may be fixedly secured to the surface 14 by any suitable fastening means 26, such as a screw or bolt. The opposite end of the band 24 may be secured to the conical surface 16 by an intermediate spring 28 which will maintain the band 24 under the appropriate tension. The band 24 may be made of any suitable flexible material and the tension characteristics may be varied by varying the dimensions of the band or providing the band with suitable cutouts in a manner well known in the art.

Figure 4:
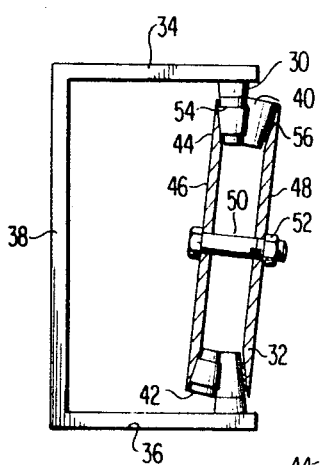
FIG. 4 is a side elevation view, partly in cross-section, of a modified form of circular roller band device utilizing conical guide walls and conical rollers.
Figure 3:
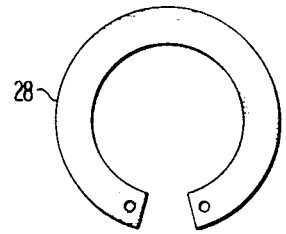
FIG. 3 is a plan view showing the configuration of the flexible band used in the device shown in FIGS. 1 and 2.
Figure 5:
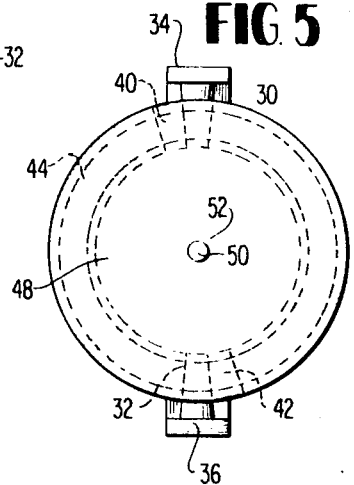
FIG. 5 is a side elevation view of the device in FIG. 4 as viewed from the right.
Figure 6:
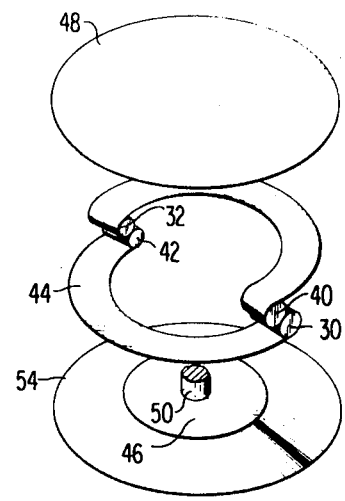
FIG. 6 is an exploded perspective view of the conical plates, conical rollers and endless flexible band as used in FIGS. 4 and 5 to show the relative arrangement of the various parts.

Although the members 10 and 12 have been indicated as being stationary in FIG. 1, it is obvious that the rollers 20 and 22 could be mounted for rotation about their axes on a stationary member and that the members 10 and 12 would be free for rotary movement about their common axis. In the embodiment shown in FIG. 4, a pair of conical members 30 and 32 are rigidly secured to the opposed arms 34 and 36 respectively, of a stationary C-shaped support bracket 38. A pair of conical rollers 40 and 42 identical to the stationary conical members 30 and 32 are disposed adjacent the members 30 and 32 respectively and an endless tension band 44 is disposed in an S-shaped configuration about each contiguous pair of conical members. A pair of plates 46 and 48 are secured together in opposed spaced apart relation by means of a bolt 50 and a nut 52. The outer circumferential opposed portions of the plates 46 and 48 are provided with opposed conical surfaces 54 and 56. The apices of the conical surfaces meet on the axis of the bolt 50 midway between the opposed plates 46 and 48.

The endless band 44 is disposed under tension and the unit comprised of the plates 46 and 48 and the connecting bolt 50 is free to rotate about the axis of the bolt 50 as well as rotate about the aligned axes of the stationary conical members 30 and 32. It is to be understood that the stationary and movable units may be reversed, that is the unit comprised of the plates 46 and 48 may be mounted in a stationary manner and the C-shaped frame 38 may rotate thereabout.

Figure 7:
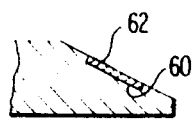
FIG. 7 is a partial sectional view showing the band disposed in a groove.

To provide for more accurate relative movement between the conical rollers and the conical surfaces in all of the embodiments, the conical surfaces and/or the surfaces of the rollers may be provided with a guide groove 60 for the tension band 62 as shown in FIG. 7. The band may protrude from the groove or be completely recessed within the groove in the conical surfaces and/or the surfaces of the rollers.

It will be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. A circular roller-band device comprising a pair of spaced apart walls having opposed conical surfaces, at least one pair of rotatable conical members disposed intermediate said walls and movable in a circular path along said conical surfaces, said pair of rotatable conical members having a combined cross-section dimension greater than the spacing between said conical surfaces, and a band looped in a generally S-shaped fashion about adjacent rotatable conical members and maintained under tension.

2. A circular roller-band device as set forth in claim 1, wherein one end of said flexible band is secured to one of said conical surfaces and the opposite end of said flexible band is secured to the other of said conical surfaces.

3. A circular roller-band device as set forth in claim 2, further comprising spring means secured between one end of said flexible band and one of said conical surfaces.

4. A roller-band device as set forth in claim 3, wherein two pairs of rotatable conical rollers are disposed between said conical surfaces and said flexible band is an endless band.

5. A circular roller-band device as set forth in claim 4, wherein one roller of each pair of rollers is stationary and arranged with the axes thereof aligned.

6. A circular roller-band device as set forth in claim 1, further comprising guide groove means for said band.

* * * * *